United States Patent Office 3,152,175
Patented Oct. 6, 1964

3,152,175
PRODUCTION OF N-SUBSTITUTED CARBAMYL CHLORIDES
Johannes H. Ottenheym, Sittard, and Johan W. Garritsen, Geleen, Netherlands, assignors to Stamicarbon N.V.
No Drawing. Filed Jan. 23, 1961, Ser. No. 83,956
Claims priority, application Netherlands, Jan. 25, 1960, 247,720
10 Claims. (Cl. 260—544)

The present invention relates to the production of N-substituted carbamyl chlorides.

The principal object of the present invention is to provide certain new N-substituted carbamyl chlorides, and procedures for making same. Other objects will also be hereinafter apparent.

As described in Serial No. 839,078 filed September 10, 1959, and now abandoned, 2-chloroazacyclo-2.3-alkene 1-carbochlorides may be obtained by contacting ω-lactams with phosgene in the liquid phase using sufficient excess phosgene to maintain the reaction mixture essentially free from uncombined lactam. Typically, this is accomplished by using a reaction mixture comprising at least 2.5 mols of phosgene per mol of lactam. With this excess phosgene, the lactam is substantially immediately reacted with the phosgene to give the desired reaction product. The reaction aparently proceeds through chlorination of the lactam at the carbon atom of the carbonyl group followed by acylation of the chlorinated product at its nitrogen atom.

According to the present invention, it has now been found that other N-substituted acid amides can also be reacted with phosgene to produce, through chlorination and acylation, valuable N-substituted carbamyl chlorides. Thus, in accordance with the inventive concepts described herein, N-substituted carbamyl chlorides having the formula

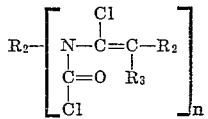

wherein $n$ is an integer from one to two; $R_1$ is selected from the group consisting of alkyl, aryl and aralkyl; $R_2$ is a radical selected from the group consisting of hydrogen, alkyl, phenyl, p-nitro phenyl, and m-methyl phenyl; and $R_3$ is a radical selected from the group consisting of hydrogen, chlorine, bromine and methyl; are obtained by providing an acid amide having the formula

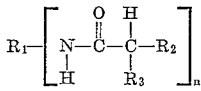

where $n$, $R_1$, $R_2$ and $R_3$ have the same meanings as above, said acid amide containing only one hydrogen atom bound to the amide nitrogen atom and at least one hydrogen atom bound to the carbon atom adjacent the carbonyl group; chlorinating this amide at the carbon atom of its carbonyl group and acylating the resulting chlorinated product at its nitrogen atom by reacting said amide with phosgene in the liquid phase, the substantial presence of unreacted free amide in the reaction mixture being avoided by maintaining sufficient excess phosgene therein to effect essentially immediate reaction of the amid therewith.

Desirably, the phosgene is used in an amount equivalent to at least 2 mols of phosgene per mol of acid amide. The amide may be used in the form of its hydrochloride salt or the like which is allowed to dissociate in the reaction mixture to give the free amide which is immediately reacted with the phosgene to avoid the presence of uncombined free amide in the mixture. Preferably, the reaction is carried out by passing the selected amide, as such or in the salt form mentioned above, into a body of phosgene maintained in the liquid phase, care being taken to avoid the presence of uncombined free amide by immediate reaction with phosgene in the mixture.

The carbamyl chlorides obtained by the present process are new products and can be used, inter alia, as intermediates in the preparation of urethanes by reaction with alcohols, e.g., ethanol or 1,4-butanediol.

The carbamyl chlorides can also be used in the preparation of α-halogeno carbonic acids by reaction with hypohalogen compounds and subsequent hydrolysis. This can be accomplished by mixing the carbamyl chloride with a hypohalogen compound, for instance a hypohalogenic acid, such as hypochlorous acid or hypobromous acid, or a salt thereof, such as sodium hypochlorite or calcium hypochlorite, in the presence of water, preferably at a temperature of 0–20° C., and subsequently heating the reaction mixture in the presence of a mineral acid, e.g., hydrochloric acid. In this process an intermediate product is formed containing the group

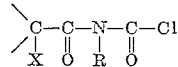

wherein R is $R_1$ in the formulae above and X is halogen, which on hydrolysis is converted into an α-halogeno carbonic acid and a primary amine or into an α-halogeno ω-amino carbonic acid, depending on whether an acyclic carbamyl chloride is used or acyclic carbamyl chloride wherein the nitrogen atom is contained in the ring structure.

The present process requires the use of an acid amide in which only one hydrogen atom is bound to the amide nitrogen atom and at least one hydrogen atom is bound to the carbon atom next to the carbonyl group. The invention is broadly applicable to any such acid amide so that all acid amides, whether cyclic or acyclic, answering the foregoing description can be used for this purpose. It will be appreciated from this that the process is also applicable to acid amides containing two or more amido groups. In such case, substituted carbamyl chlorides containing two or more

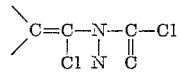

groups, are formed.

The reaction of the acid amide with phosgene is normally carried out at a temperature between −5° C. and +150° C. At temperatures lower than −5° C., the reaction speed is very low while at temperatures above 150° C., decomposition reactions occur. Desirably, the operating temperature is between 45° and 120° C. since a substantially complete conversion of the acid amide is obtained in most cases within a reasonable period of time when operating within this range.

In carrying out the reaction, liquid phosgene may be used. In this event, superatmospheric pressures should be used to keep the phosgene in the liquid state. Extremely high pressures are not necessary for this purpose, a pressure of 10 to 50 atm. usually being sufficient.

In lieu of using liquid phosgene, it is preferred to use the phosgene in the form of a solution utilizing a solvent which will not react with the phosgene under the reaction conditions. Typically suitable solvents are, for example, hydrocarbons, such as benzene and toluene and halogenated hydrocarbons, such as chloroform, carbon tetrachloride, monochlorobenzene and dichlorobenzene.

If a solvent solution of phosgene is used, the reaction can be carried out under atmospheric pressure. In this event, it is advisable to initially maintain a relatively low temperature, e.g. from −5° to +36° C., during the time the reactants are being brought together. Thereafter, the reaction temperature may be increased to 45–100° C., at which temperature the reaction is continued for some hours, e.g., 2 to 10 hours. This two stage operation minimizes the production of undesired by-products.

When a solution of phosgene is used, it may also be advantageous to apply superatmospheric pressures, preferably within the range of 10 to 25 atm. In this case, the acid amide and phosgene may be brought together at a higher temperature (20 to 45° C.) and the temperature can thereafter be raised rather quickly, preferably to 90–120° C. This has the advantage that the reaction may be completed in from 20 minutes to 2 hours. A higher yield is also obtained.

It is essential to the success of the invention that the substantial presence of uncombined free amide in the reaction mixture is avoided. If this is not done, the formation of undesired by-products increases. The total amount of phosgene used, preferably should be at least 2 mols of phosgene per mol of acid amide. If the amount of phosgene is below this limit, the formation of undesired by-products increases. Except for this lower limit, however, the amount of phosgene may be varied considerably and will depend, at least to some extent, on whether liquid phosgene or a solvent solution of phosgene is used. Thus, when a solvent is used, the solvent is desirably saturated with phosgene and it is customary to work with 3 to 8 mols of phosgene per mol of acid amide. On the other hand, when liquid phosgene is employed, it is usual to work with a substantial excess of phosgene, for instance, from 8–15 mols of phosgene per mol of acid amide. In this case, the great excess of phosgene gives a reaction mixture which is essentially a solution in phosgene. This offers the advantage that the reaction mixture can easily be stirred thus promoting a smooth reaction.

It will be appreciated from the foregoing that the reaction preferably is carried out by adding the amide to the phosgene using the indicated excess of phosgene in order to effect essentially immediate reaction of the amide and avoid the presence of any significant amount of uncombined free amide in the reaction mixture. The amide, as added to the phosgene, may be in the molten condition or dissolved in an appropriate solvent, e.g., toluene or chloroform. The excess phosgene may be recovered in processing the reaction product and can be used again. Purification of the crude reaction product may be effected by straightforward distillation.

The invention is further illustrated but not limited by the following examples:

Example I 250 ml. of benzene were introduced into a spherical reaction vessel having a capacity of one liter and provided with a stirrer and a reflux cooler through which ice water was pumped. 150 g. (1.5 mols) of phosgene were dissolved in this benzene. A solution of 37 g. (0.25 mol) α-chloro-ε-caprolactam in 300 ml. benzene was slowly added in one hour, while the temperature in the reaction vessel was raised to 25–30° C. After that, the temperature of the reaction mixture was gradually increased in 90 minutes to 65° C. and then kept at this value for 4 hours.

After the reaction, the excess of phosgene and the benzene were removed by distillation at normal pressure. The reaction product was then distilled in vacuo at a pressure of 2 mm. Hg. At 110–112° C., there was distilled a straw-colored oil which, upon standing, changed into a solid substance with a melting point of 39° C. This substance, 2,3 - dichloro-azacyclo - 2.3 - heptene 1-carbochloride, was purified by recrystallization from cyclohexane. A white, crystalline substance with a melting point of 42° C. was then obtained. The output amounted to 41 g., which corresponds with a yield of 71.8%.

Example II

In the reaction vessel used in Example I, α,α-dichloro ε-caprolactam was treated with phosgene in the same way. After the experiment the α,α-dichloro ε-caprolactam appeared to be unchanged, thus showing that no reaction had taken place.

Example III 500 g. (appr. 5 mol) of phosgene were dissolved in 600 ml. of benzene in a spherical reaction vessel having a capacity of two liters and a stirrer and a reflux cooler through which ice water was pumped. A solution of 115 g. (1 mol) of N-propylpropionic acid amide in 250 ml. of benzene was slowly added in one hour, while the temperature in the reaction vessel was kept at 25–30° C. After that, the temperature of the reaction mixture was gradually raised to 65–70° C. in 90 minutes and then kept at this value for 4 hours.

After the reaction, the phosgene and the benzene were removed by distillation at normal pressure. A light yellow liquid was left, which was distilled at a pressure of 2 mm. Hg and a temperature of 78° C. The liquid thus obtained had a refractive index of $n_D^{20}=1.4805$ and, according to the analysis, consisted of N-propyl N-(1-chloro 1-propenyl) carbamyl chloride. The output was 162.5 g., which corresponds with a yield of 83%.

Example IV

In the reaction vessel used in Example III, 500 g. of phosgene were dissolved in 500 ml. of chloroform. Thereafter, a solution of 325 g. (1 mol) of N-propyl-stearic acid amide in 500 ml. chloroform was added in 1.5 hours, while the temperature in the reaction vessel was kept at 25–30° C. The temperature was then gradually increased to 58–60° C. in 1.5 hours and the reaction mixture was kept at this temperature for 4 hours.

After removing the phosgene and the chloroform by distillation, the liquid left was distilled at a pressure of 3 mm. Hg. In this way, 251.5 g. of a liquid boiling at 205–210° C. at this pressure and having a refractive index of $n_D^{20}=1.4682$, were obtained. This liquid consists of N-propyl N-(1-chloro 1-octadecenyl) carbamyl chloride. The efficiency of the conversion amounts to 62%.

Example V

In the same way as described in the preceding examples, a solution of 150 g. (0.75 mol) of N,N'-diacetyl-hexamethylenediamine in 1.5 liters of chloroform was added at 20° C. in a period of 2 hours to 800 g. (appr. 8 mol) of phosgene dissolved in 300 ml. of chloroform. The reaction mixture was then heated to 58° C. in 1.5 hours and allowed to react at that temperature for 4 hours.

After the reaction, the chloroform was distilled off. A resinous product that could not be distilled was left. Recrystallization of this resin from a mixture of ethanol and benzene (15:85) yielded a white solid substance with a melting point of 45° C. which was identified as N,N'-bis (1-chloroethenyl) hexamethylene 1.6 dicarbamyl chloride. The output was 141 g. the yield being 52%.

Example VI

A solution of 75 g. (0.5 mol) of phenylacetyl N-methylamide in 250 ml. of chloroform was added in one hour and at 25–30° C., to a solution of 300 g. (appr. 3 mols) of phosgene in 400 ml. of chloroform. After that, the reaction mixture was heated to 57° C. in one hour and kept at that temperature for four hours.

The chloroform was then distilled off and the residue distilled over at a pressure of 1 mm. Hg and a temperature of 135–137° C. This yielded 79 g. of N-methyl N-(1-chlorophenylethenyl) carbamyl chloride, a liquid with a refractive index of $n_D^{20}=1.5810$. The yield amounted to 68.7%.

Example VII

A solution of 149 g. (1 mol) of N-phenylpropionic acid amide in 1 liter of toluene was added in 2 hours at 25–30° C. to a solution of 500 g. (appr. 5 mols) of phosgene in 300 ml. of toluene. After that, the temperature was raised to 80° C. in 2 hours and kept at that temperature for 4 hours.

The toluene was for the greater part distilled off at normal pressure and the residue distilled at a pressure of 2 mm. Hg. At 128° C., 133.5 g. of a liquid consisting of N-phenyl N-(1-chloro 1-propenyl) carbamyl chloride distilled over at this pressure. The refractive index of this liquid was $n_D^{20}=1.5568$. The yield amounted to 58%.

Example VIII

In a round bottom flask with a capacity of 0.5 liter, a solution of 12.9 g. (0.1 mol) of N-propyl isobutyric acid amide in 50 ml. of chloroform was added in 15 minutes at a temperature of 24° C. to a solution of 80 g. (0.8 mol) of phosgene in 200 ml. of chloroform. The temperature of the reaction mixture was then raised to appr. 60° C. in one hour. Heating at that temperature was continued for 4 hours.

The chloroform was then distilled off at normal pressure. The liquid left was distilled at a pressure of 3 mm. Hg. At this pressure and a temperature of 73° C., a liquid with a refractive index of $n_D^{20}=1.4800$ distilled over, the liquid consisting of N-propyl N-(1-chloro 1-isobutenyl) carbamyl chloride. The output was 16.5 g., which corresponds with a yield of 78.6%.

It will be appreciated from the foregoing that the N-substituted carbamyl chlorides of the invention are characterized by containing one or more

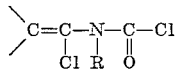

groups wherein R is alkyl, aryl, aralkyl or alkaryl. Typically, R may be lower alkyl, e.g., methyl, ethyl, propyl or butyl, or even higher; phenyl, chlorophenyl, bromophenyl, tolyl; benzyl and the like. The terminal bonds of the end carbon atom of the characterizing group may be satisfied by such atoms or radicals as hydrogen, alkyl, aryl, etc. Representative N-substituted carbamyl chlorides, in addition to those noted above, include the following:

N-heptadecyl N-(1-chloro-ethenyl) carbamyl chloride,
N-octacosyl N-(1-chloro 1-octadecenyl) carbamyl chloride,
N-pentadecyl N-(1-chloro 1-hexadecenyl) carbamyl chloride,
N-(2,3-dimethylpentyl) N-(1-chloro 1-eicosenyl) carbamyl chloride,
N-propyl N-(1-chloro 1,9-octadecadienyl) carbamyl chloride,
N-(2-phenylethyl) N-(1-chloro 1,13-docosadienyl) carbamyl chloride,
N-(3-phenylpropyl) N-(1-chloro 1,9,12-octadecatrienyl) carbamyl chloride,
N-butyl N-(1,3-dichloro 1-butenyl) carbamyl chloride,
N-octyl N-(1,2-dichloro 1-hexadecenyl) carbamyl chloride,
N-methyl N-(1,5-dichloro 1-pentenyl) carbamyl chloride,
N-isopropyl N-(1-chloro 2-bromo 3-methyl 1-butenyl) carbamyl chloride,
N-propyl N-(1-chloro 2-p.nitrophenyl ethenyl) carbamyl chloride,
N-phenyl ethyl N-(1-chloro 2-phenyl 1-propenyl carbamyl chloride,
N-butyl N-(1-chloro 1-cyclohexylidene methyl) carbamyl chloride,
and N-ethyl N-(1-chloro 2-m-methylphenyl ethenyl) carbamyl chloride.

The starting amides for these products are, respectively, N-heptadecyl acetic acid amide, N-octacosyl stearic acid amide, N-pentadecyl palmitic acid amide, N-(2,3-dimethylpentyl) arachidic acid amide, N-propyl oleic acid amide, N-(2-phenylethyl) erucic acid amide, N-(3-phenyl propyl) linoleic acid amide, N-butyl β-chloro butyric acid amide, N-octyl α-chloro palmitic acid amide, N-methyl δ-chloro valeric acid amide, N-isopropyl α-bromo isovaleric acid amide, N-propyl, p.nitrophenyl acetic acid amide, N-phenylethyl α-phenyl propionic acid amide, N-butyl cyclohexane carboxylic acid amide, and N-ethyl m.methylphenyl acetic acid amide.

It will be recognized that various modifications may be made in the invention described herein. Accordingly, the scope of the invention is set forth in the following claims wherein

We claim:

1. A process for producing an N-substituted carbamyl chloride having the formula

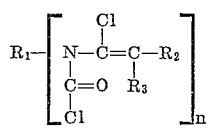

where $n$ is an integer from one to two and
 (a) $R_1$ is a radical selected from the group consisting of alkyl, aryl and aralkyl;
 (b) $R_2$ is a radical selected from the group consisting of hydrogen, alkyl, phenyl, p-nitro phenyl, and m-methyl phenyl; and
 (c) $R_3$ is a radical selected from the group consisting of hydrogen, chlorine, bromine, and methyl;
which comprises
 adding an acid amide having the formula

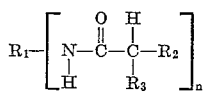

where $n$, $R_1$, $R_2$ and $R_3$ have the same meanings as above, to an excess of liquid phase phosgene in an amount equal to at least 2 mols phosgene per mol of said acid amide, and thereby essentially immediately reacting said phosgene with said acid amide at a temperature between −5 and 150° C. and a pressure of 1 to 50 atmospheres, to thereby avoid the presence of uncombined free amide and form said N-substituted carbamyl chloride.

2. The process of claim 1 wherein the amide is used in the form of its hydrochloride salt, said salt being allowed to dissociate into free amide in said reaction mixture and the free amide is essentially immediately reacted with phosgene to avoid the presence of any significant amount of uncombined free amide in said mixture.

3. The process of claim 1 wherein said phosgene is used in the form of a solution thereof in an inert solvent.

4. The process of claim 1 wherein liquid phosgene is used.

5. The process of claim 1 wherein the phosgene and acid amide are first reacted with each other at a temperature of 20–45° C. and then at 90–120° C.

6. The process of claim 1 wherein said reaction is carried out at a temperature between −5° C. and 150° C. using liquid phosgene and a pressure of 10 to 15 atmospheres.

7. The process of claim 1 wherein the reaction is carried out with the phosgene in solvent solution using an initial temperature between −5° and 35° C. and then a temperature between 45 and 100° C.

8. The process of claim 1 wherein from 8–15 mols of liquid phosgene are used per mol of acid amide.

9. The process of claim 1 wherein a solvent solution of phosgene is used, the amount of phosgene being between 3 and 8 mols per mol of acid amide.

10. The process of claim 1 wherein the reaction is carried out at a pressure of 10 to 25 atmospheres.

References Cited in the file of this patent

UNITED STATES PATENTS

| | | |
|---|---|---|
| 2,251,892 | Orthner et al. | Aug. 5, 1941 |
| 2,480,088 | Slocombe et al. | Aug. 23, 1949 |
| 2,698,343 | Stein et al. | Dec. 28, 1954 |

OTHER REFERENCES

Jones et al.: J. Chem. Soc. (London), volume of 1949, pages 547–552.

Arnold: C.A., volume 53, page 4112 (1959).

Arnold: "Coll. Czech. Chem. Comm.," volume 24, 1959, pages 4048–4049.

UNITED STATES PATENT OFFICE
CERTIFICATE OF CORRECTION

Patent No. 3,152,175                            October 6, 1964

Johannes H. Ottenheym et al.

It is hereby certified that error appears in the above numbered patent requiring correction and that the said Letters Patent should read as corrected below.

Column 1, lines 39 to 44, for the left-hand portion of the formula reading:

$R_2-$             read            $R_1-$ column 2, lines 45 to 47, the formula should appear as shown below instead of as in the patent:

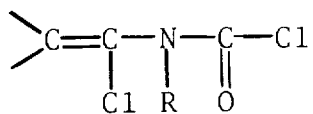

Signed and sealed this 15th day of June 1965.

(SEAL)
Attest:

ERNEST W. SWIDER                      EDWARD J. BRENNER
Attesting Officer                        Commissioner of Patents